(No Model.)

F. J. PATTEN.
ELECTROMAGNETIC MOTOR.

No. 586,823. Patented July 20, 1897.

WITNESSES:
Frank S. Ober
Harry Bailey

INVENTOR
Francis J. Patten.

UNITED STATES PATENT OFFICE.

FRANCIS JARVIS PATTEN, OF NEW YORK, N. Y.

ELECTROMAGNETIC MOTOR.

SPECIFICATION forming part of Letters Patent No. 586,823, dated July 20, 1897.

Application filed December 4, 1896. Serial No. 614,466. (No model.)

*To all whom it may concern:*

Be it known that I, FRANCIS JARVIS PATTEN, a citizen of the United States, residing at New York, in the county and State of New York, have invented certain new and useful Improvements in Electromagnetic Motors, of which the following is a clear description.

The motor will be understood from the accompanying drawings, in which—

Figure 1:
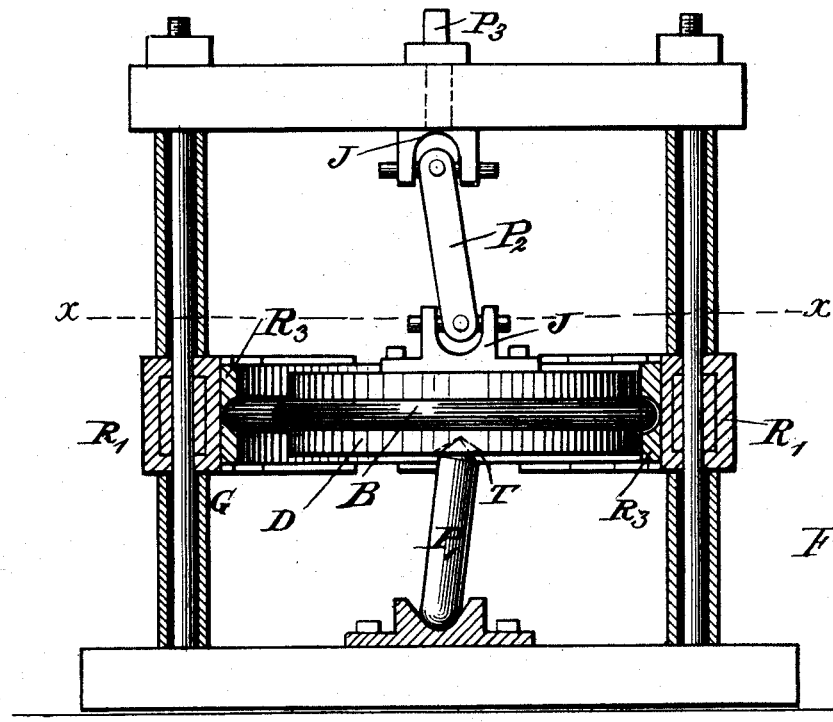
Figure 2:
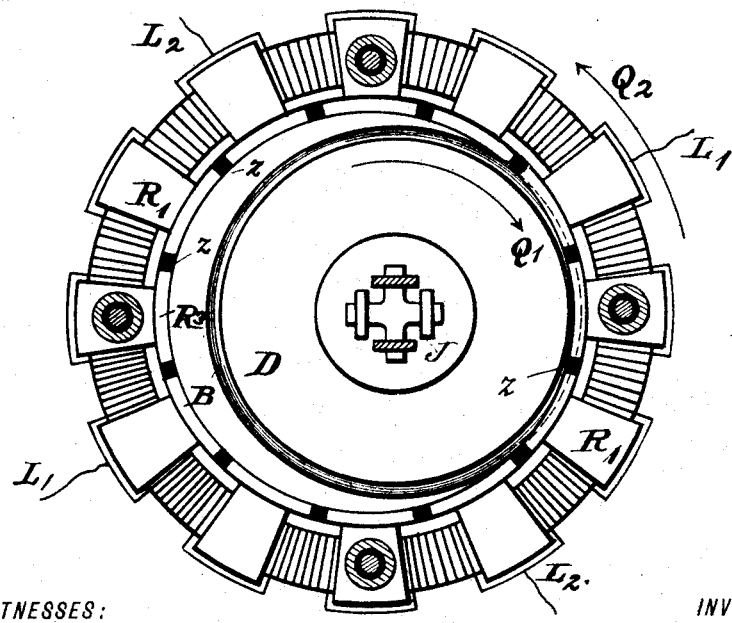

Figure 1 represents an elevation, partly in section, of my machine; and Fig. 2 is a plan view of the apparatus shown in Fig. 1 on a horizontal plane through the line $x\,x$ of the latter figure.

It is well known that in very early forms of electric motors the attraction of a magnet-pole for a revoluble piece of iron, called its "armature," was the entire principle of motion and power. This principle has long been abandoned in favor of types in which the current-carrying winding of an armature cuts the lines of force of a magnetic field in a continuous uninterrupted manner. In those earlier forms the magnetism had to be periodically interrupted or destroyed after a certain amount of work had been done and again renewed after the old conditions had been restored, which is the chief reason of the low efficiency of such early forms of motors depending on magnetic attraction solely for their performance.

It seems to be impossible with direct-current motors either to make a magnet-pole continuously attract an armature or to use magnetic "sticktion," as it has been styled, continuously to keep an armature in motion under the influence of a magnet.

The term "sticktion" is here used to define the pull or effort exerted by a magnet upon an iron armature actually in contact with a pole or poles and which is many times greater than any attractive power that can be exerted by the same magnet on the same armature across an air-gap, however small. It is, in fact, a general assumption of electrotechnics that magnetic sticktion, implying, as it does, rigidity and a fixed relation of magnet and armature, cannot be made continuously available without interruption to produce motion. This assumption, however, is not in accordance with the truth. In rotary-field motors magnetic sticktion, as distinguished from magnetic attraction, can be used to produce motion. Figs. 1 and 2 show the operative parts and functions of such a motor.

R' is a magnetizable ring in which biphase alternating currents introduced to its winding through the circuits L' L' and $L^2$ $L^2$, Fig. 2, in the usual way set up a rotating magnetic field, the polar line of which will be a continuously-revolving diameter of the ring according to well-known principles.

For convenience of illustration the ring is represented as being supported in a horizontal position. Inside the ring is placed a disk of iron circular in form and of less diameter than the inside of the ring. The iron disk (indicated by D, Figs. 1 and 2) may have about the same thickness as the ring, inside of which it is supported in the general plane of the ring itself, as indicated in the drawings. It is provided with a flange or rib B, Figs. 1 and 2, which is continuous around its cylindrical edge. Inside the ring and inside its winding, which is let into grooves, making polar projections, as shown, is fitted another iron ring $R^3$, Figs. 1 and 2, broken at intervals, as shown, between the polar projections of the main ring by short air-gaps or nonmagnetic spaces Z Z. This interior ring is also provided with a groove or slot all around its inner periphery and lying in the middle plane of the magnetic-ring system. The groove in the interior ring is given a size and form suitable to enable the flange B on the disk D to just fit freely into it, thus giving support to the disk along so much of its edge as sets into the groove or slot when the disk is in tangential contact with the ring at one side. Further support is given the disk by the spindle P', which, as shown in Fig. 1, has a rest at its lower end in which it is free to revolve, while its upper end has a conical point that fits into a larger conical recess T at the center of the lower side of the disk. The disk will therefore be supported in a horizontal position mechanically without the aid of magnetism in the ring by the combined action of the flange B, the groove $R^3$, and the spindle P' with its foot-rest. Evidently none of these mechanical parts in any way prevent the disk from rolling around or assuming any possible horizontal position inside the ring. If now one of the magnetizing-circuits of the ring be given current, thus creating a polar line on a fixed diameter of the ring, the disk will at once adhere to the ring at one side, being magnetized by the ring, and will constitute a solid-iron armature extending from one pole of the ring-magnet almost across to the other, thus nearly closing the magnetic circuit, there being a small air-gap amounting to the difference between the diameters of the disk and the inside ring, and this difference can evidently be made very small.

A peculiar and important feature of this device is that so long as the ring is magnetized the disk will adhere to one side of it, with the so-called power of magnetic sticktion not attraction at a distance. Now if the other circuit be also given current the two currents will produce a rotating magnetic field—that is to say, the polar line, always a diameter of the ring, will continuously revolve around the ring, say in the direction indicated by the arrow $Q^3$, Fig. 2. Under these conditions the disk in its effort to bridge the magnetic circuit will roll around the inside of the ring, keeping its edge continuously against the inner surface of the ring at one extremity of the revolving polar diameter of the ring. Rolling in this manner, as the disk must in order to keep a diameter in line with the revolving field, it will revolve on its own axis in a direction opposite to that of the field, as indicated by the arrow $Q'$, Fig. 2. Inasmuch, however, as the disk cannot slip, owing to the sticktion effect and consequent friction between disk and ring, the disk in revolving will accurately measure its periphery along that of the interior periphery of the ring; but as the latter is a little the greater of the two the disk must of necessity make a little more than one complete revolution about its own axis in making one revolution around the ring.

In general terms, therefore, the apparatus constitutes an electromagnetic motor and eccentric movement which may have many novel applications in the electric arts. As a motor the system is evidently one of the old magnetic-attraction type, in which, however, the sticktion effect before defined is also simultaneously and continuously operative, the latter feature being a result not heretofore accomplished because such a continuous effort cannot be made continuous by mechanically shifting the axis of magnetization of the ring by successive or periodic jumps, such as would necessarily result from a system of commutation. The interior wall of the iron ring is practically an endless track upon which the disk rolls continuously, being drawn to successively-advancing positions by the continuously-changing direction of the magnetic attraction, which is always exerted across an infinitely small distance. Evidently the disk D has two distinct mechanical movements, one about its own axis, due to its rolling around the ring, and this motion can be communicated to other parts. In one revolution around the ring, however, the center of the disk describes a small circle around the center of the ring, so the center of the disk has an eccentric movement with respect to the center of the ring. This movement can be rectified to a true axial one by well-known means, such as the two universal joints J J and the connecting-spindle $P^2$, which describes a cone in its movement about the vertical axis of the machine; but any part carried by the upper spindle $P^3$ will have a true axial motion as distinguished from an eccentric one and will of course have the same rate of rotation as the disk D has about its own center.

It remains to explain why the inner ring $R^3$, Fig. 2, is broken by air-gaps between the polar projections of the ring proper. The disk is in contact with the interior ring at one side only, at the extremity of a polar diameter. It fails to close the magnetic circuit by an air-gap which amounts nearly to the difference between its own diameter and that of the inner ring, Figs. 1 and 2. Now if the inner ring were continuous it would itself close the magnetic circuit, as it evidently must be of iron, and prevent the disk doing so. For this reason the inner iron ring is broken by air-gaps placed between the poles of the main ring, the aggregate sum of the gaps in a semicircumference being made considerably greater than the air-gaps between the disk and the ring.

Having thus described my invention, what I claim, and desire to secure by Letters Patent, is the following:

1. In a rotary-field electric motor, a fixed-ring field-magnet energized by multiphase alternating currents provided with an internally eccentrically pivoted armature of magnetizable material tangentially in contact with the ring field-magnet internally at one pole thereof and adapted to follow the rotating magnetic field by rolling around the inside periphery of the ring substantially as described.

2. In a rotary-field electric motor, a fixed annular field-magnet energized by multiphase alternating currents, provided with a fixed internal ring or track, within and in contact with which an internal eccentrically-pivoted magnetizable armature is adapted to follow the rotating magnetic field by continually rolling around said inner ring, while turning around its own eccentrically-pivoted axis substantially as described.

3. In an electric motor, a ring field-magnet energized by multiphase alternating currents whereby a rotating magnetic field having a definite rate of rotation is established in the ring, an eccentrically-pivoted armature rolling in tangential contact with the ring internally actuated by the attraction of the moving magnetic field whereby an axial rotation of the rolling armature is produced that has a fixed different rate of rotation from that of the rotating magnetic field substantially as described.

In testimony whereof I subscribe my signature in presence of two witnesses.

FRANCIS JARVIS PATTEN.

Witnesses:
HARRY BAILEY,
FRANK S. OBER.